Oct. 30, 1951  D. B. REDWARD  2,573,062
HOT AND COLD WATER CONTROL VALVE
Filed Feb. 15, 1946
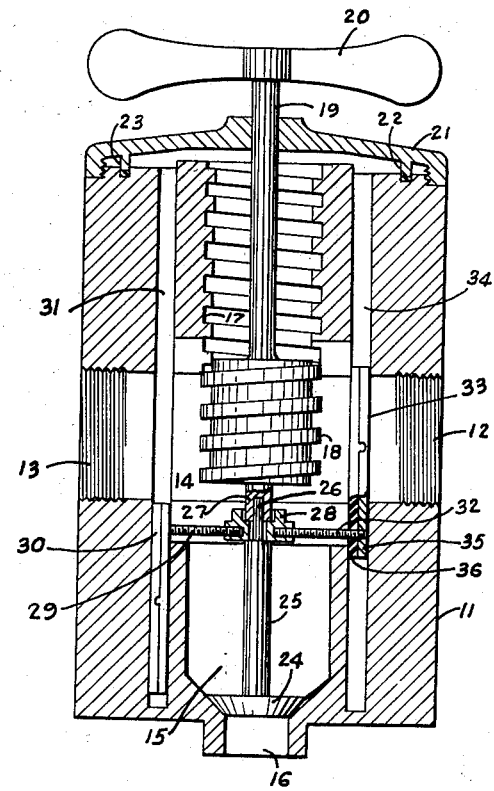
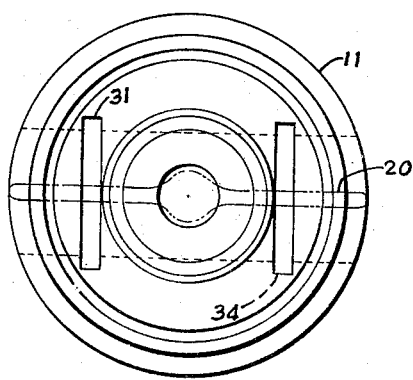
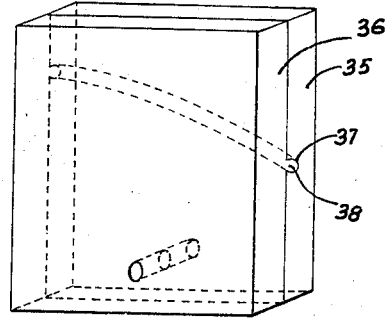
INVENTOR.
DOROTHY B. REDWARD
BY Patented Oct. 30, 1951

2,573,062

UNITED STATES PATENT OFFICE 2,573,062

HOT AND COLD WATER CONTROL VALVE

Dorothy B. Redward, Seattle, Wash.

Application February 15, 1946, Serial No. 647,829

2 Claims. (Cl. 277—18)

This invention relates to improvements in control valves and more particularly to a control valve for controlling the flow of and mixing of hot and cold water in desired proportions.

A main object of the invention is to provide a novel and improved hot and cold water control valve where either hot water, cold water or warm water may be obtained by the manipulation of a single valve handle, said valve being of very simple construction, being very efficient in operation and being very easy to assemble.

A further object of the invention is to provide an improved control valve for controlling the flow of and mixing of hot and cold water in desired proportions, said valve consisting of a small number of easily manufacturable parts, being very reliable in operation and being very easy to maintain in repair.

Further objects and advantages of the invention will become apparent from the following description and claims and from the accompanying drawings, wherein:

Figure 1 is a vertical cross-sectional view of a hot and cold water control valve constructed in accordance with the present invention.

Figure 2 is a top plan view of the control valve of Figure 1.

Figure 3 is a perspective detail view of a valve gate member employed in the control valve member of Figure 1.

Referring to the drawings, 11 designates a housing of generally cylindrical shape formed with a first tapped side opening 12 adapted to be connected to the hot water supply pipe of a water system and a second tapped side opening 13 adapted to be connected to the cold water supply pipe of the system. Housing 11 is formed with a central mixing chamber 14 having a downwardly extending vertical outlet passage 15 provided with a discharge spout 16. Above outlet passage 15 housing 11 is formed with an internally threaded vertical bore 17 which contains a helically threaded screw member 18 threadedly engaging bore 17 and provided with a vertical actuating shaft 19 which extends outwardly through bore 17 and projects above the top of housing 11, a handle 20 being rigidly secured thereto. A cap member 21 is threadedly secured to the top of housing 11, shaft 19 rotatively passing through a central opening in said cap member. An annular washer 22 is provided between cap member 21 and housing 11, said washer being received in an annular groove formed in the top of housing 11 and being engaged by a depending annular rib 23 formed in cap member 21 to thereby seal bore 17.

The lower end of screw member 18 carries a conical valve member 24 which cooperates with a valve seat formed in passage 15 adjacent spout 16 to control the discharge of water from said spout. Valve member 24 is mounted on a vertical shaft 25 connected to screw member 18 by a reduced top portion 26. Rotatably engaging the upper portion of shaft 25 and supported between the shouldered portion thereof adjacent reduced top portion 26 and a depending lug portion 27 formed on screw member 18 is a collar 28. Secured to collar 28 is a first horizontal stud member 29 extending toward cold water opening 13 and connected to the upper portion of a rectangular gate member 30. Gate member 30 is slidably positioned in a vertical guide way 31 extending for substantially the full height of housing 11. Secured to collar 28 opposite stud member 29 is a second stud member 32 extending toward hot water opening 12 and connected to the lower portion of a rectangular gate member 33. Gate member 33 is slidably positioned in a vertical guide way 34 similar to guide way 31.

When valve member 24 is seated, as shown in Figure 1, gate member 33 is positioned in obstructing relation to hot water opening 12 and gate member 30 is in depressed position in its guide way, allowing cold water to enter chamber 14. When handle 20 is rotated valve member 24 is lifted off its seat, allowing cold water to emerge from spout 16. As handle 20 is rotated further, gate members 30 and 33 are moved upwardly, allowing hot water to enter chamber 14 below gate member 33 and partially obstructing the supply of cold water past the top of gate member 30. By manipulating handle 20, any desired proportion of cold and hot water may be introduced into chamber 14. When handle 20 is rotated to its extreme upper position, gate member 30 completely blocks cold water opening 13 and hot water opening 12 is completely unobstructed. It is thus possible to obtain at spout 16 either cold water, hot water or water of any desired intermediate temperature.

The gate members are each composed of a metal plate 35 having removably secured thereto a deformable plate 36 of hard rubber or similar washer material. Plate 35 is formed with a curved undercut groove 37 which receives a similarly formed rib 38 integrally carried by deformable plate 36. When the gate is positioned in water obstructing relation to chamber 14, water pressure forces deformable plate 36 into sealing relationship to the adjacent inlet opening periphery of chamber 14, thereby preventing undesired mixing of the hot and cold water.

While a specific embodiment of a hot and cold water control valve has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A hot and cold water control valve comprising a housing having a first inlet opening for hot water, a second inlet opening for cold water, and a discharge opening, a control member threadedly engaging said housing, a valve member secured to said control member, a seat for said valve member in said discharge opening, said valve member being adapted to be moved from and toward said seat by rotation of said control member to thereby control the opening and closing of said discharge opening, a first gate member in said housing adapted to be moved across said first inlet opening, said housing being formed with a guide way slidably receiving said first gate member, said guide way extending in a plane parallel to said control member and normal to and intersecting the axis of said first inlet opening, a second gate member in said housing adapted to be moved across said second inlet opening, said housing being formed with a second guide way extending in a plane parallel to said control member and normal to and intersecting the axis of said inlet opening, a first lateral connecting element connecting the upper portion of said first gate member to said control member, a second lateral connecting element connecting the lower portion of said second gate member to said control member, said first gate member being held in fully open position and said second gate member being held in fully closed position with respect to their respective housing inlet openings when said valve member is in seated position and being movable through intermediate positions to fully closed position of said first gate member and fully open position of said second gate member responsive to movement of said valve member to its wide open position.

2. The structure of claim 1, and wherein each gate member comprises a rectangular metal plate formed with an undercut groove and a rectangular deformable plate formed with a rib adapted to interfit with said undercut groove to removably secure the deformable plate to the metal plate, the gate member being positioned with said deformable plate inwardly facing with respect to its housing inlet opening.

DOROTHY B. REDWARD.

REFERENCES CITED

The following references are of record in the file of this patent:

UNITED STATES PATENTS

| Number | Name | Date |
|---|---|---|
| 1,462,147 | O'Flaherty | July 17, 1923 |
| 1,502,483 | O'Flaherty | July 22, 1924 |
| 1,511,080 | Johnson | Oct. 7, 1924 |
| 2,033,255 | Riney | Mar. 10, 1936 |
| 2,145,133 | Riney | Jan. 24, 1939 |

FOREIGN PATENTS

| Number | Country | Date |
|---|---|---|
| 29,121 | Great Britain | Dec. 27, 1911 |